US008506742B2

(12) United States Patent
Terfloth et al.

(10) Patent No.: US 8,506,742 B2
(45) Date of Patent: Aug. 13, 2013

(54) METHOD FOR LAMINATING PLASTIC FILMS WITH WOOD-BASE SUBSTRATES, IN PARTICULAR FOR PRODUCING HIGH-GLOSS SURFACES

(75) Inventors: Christian Terfloth, Detmold (DE); Theodor Hippold, Bad Salzuflen (DE)

(73) Assignee: Jowat AG, Detmold (DE)

( * ) Notice: Subject to any disclaimer, the term of this patent is extended or adjusted under 35 U.S.C. 154(b) by 0 days.

(21) Appl. No.: 11/707,391

(22) Filed: Feb. 16, 2007

(65) Prior Publication Data
US 2008/0008885 A1  Jan. 10, 2008

(30) Foreign Application Priority Data

Feb. 17, 2006  (DE) .......................... 10 2006 007 869

(51) Int. Cl.
| | |
|---|---|
| B29C 65/00 | (2006.01) |
| B32B 7/12 | (2006.01) |
| B32B 27/10 | (2006.01) |
| B32B 21/04 | (2006.01) |
| B05D 3/02 | (2006.01) |

(52) U.S. Cl.
USPC ................. 156/250; 156/272.2; 156/275.5; 156/327; 156/332; 156/334; 427/372.2; 428/479.6; 428/481; 428/511; 428/514; 428/537.1

(58) Field of Classification Search
USPC ................. 428/535, 536, 537.1, 479.6, 481, 428/511, 514; 528/45; 427/408, 372.2; 156/250, 272.2, 275.5, 327, 332, 334
See application file for complete search history.

(56) References Cited

U.S. PATENT DOCUMENTS

| | | | | |
|---|---|---|---|---|
| 3,660,200 A | * | 5/1972 | Anderson et al. | 156/278 |
| 4,344,991 A | * | 8/1982 | Gray | 427/325 |
| 4,892,605 A | * | 1/1990 | Schneider et al. | 156/272.6 |
| 5,916,666 A | * | 6/1999 | Huber et al. | 428/195.1 |
| 6,585,920 B1 | * | 7/2003 | Strobel et al. | 264/80 |
| 7,005,476 B1 | * | 2/2006 | Terfloth et al. | 525/123 |
| 7,005,482 B2 | * | 2/2006 | Guse et al. | 156/308.4 |
| 2004/0209085 A1 | | 10/2004 | Erb et al. | |
| 2005/0043455 A1 | * | 2/2005 | Hohner | 524/261 |
| 2005/0255250 A1 | | 11/2005 | Becker-Weimann et al. | 427/377 |
| 2006/0235134 A1 | | 10/2006 | Bach et al. | 524/487 |
| 2007/0259012 A1 | * | 11/2007 | Castro et al. | 424/401 |

FOREIGN PATENT DOCUMENTS

| | | |
|---|---|---|
| DE | 293 547 A5 | 9/1991 |
| DE | 198 17 835 A1 | 10/1999 |
| DE | 103 49 177 A1 | 5/2004 |
| DE | 103 23 617 | 12/2004 |
| DE | 103 23 617 A1 | 12/2004 |
| EP | 0 522 240 A2 | 1/1993 |
| EP | 0 562 166 A | 9/1993 |
| EP | 0 704 482 A1 | 4/1996 |
| EP | 0 283 861 A2 | 9/1998 |
| EP | 1 508 579 A1 | 2/2005 |
| EP | 1508579 | 2/2005 |
| WO | 96/32257 A1 | 10/1996 |
| WO | WO 02/094457 A2 | 11/2002 |

OTHER PUBLICATIONS http://en.wikipedia.org/wiki/Refractive_index; Mar. 7, 2013.*
English version of the International Preliminary Report on Patentability issued by the European Patent Office in its function as International Preliminary Examination Authority (IPEA), (6 pgs.), Feb. 19, 2007.
See, listing of citations from RÖMP Chemie Lexikon, 1 page, Feb. 16, 2007.

* cited by examiner

*Primary Examiner* — Kevin R Kruer
(74) *Attorney, Agent, or Firm* — Brannon Sowers & Cracraft, PC

(57) ABSTRACT

The invention relates to a method for laminating a plastic film with a wood-base substrate, in particular for producing a high-gloss surface on a wood-base substrate, in which a plastic film is laminated by means of a laminating agent, preferably an adhesive, with a wood-base substrate and permanently bonded to the wood-base substrate, the plastic film being formed so as to be transparent on its top, and the products obtainable in this manner and their use, in particular in the area of the wood and furniture industry, for example for the production of pieces of furniture and fitments of all kinds.

12 Claims, No Drawings

METHOD FOR LAMINATING PLASTIC FILMS WITH WOOD-BASE SUBSTRATES, IN PARTICULAR FOR PRODUCING HIGH-GLOSS SURFACES

CROSS REFERENCES TO RELATED APPLICATIONS

This application claims priority to German Patent Application No. DE 10 2006 007 869.1, filed Feb. 17, 2006, entitled "METHOD FOR LAMINATING PLASTIC FILMS WITH WOOD-BASE SUBSTRATES, IN PARTICULAR FOR PRODUCING HIGH-GLOSS SURFACES". This reference is expressly incorporated by reference herein, in its entirety.

BACKGROUND OF THE INVENTION

The present invention relates to a method for laminating plastic films with wood-base substrates, and the products or laminated materials obtainable in this manner, in particular wood-base substrates laminated with plastic films, and the use thereof, in particular in the area of the wood and furniture industry, for example for the production of pieces of furniture and fitments of all kinds.

For the production of high-gloss surfaces on wood-base substrates, in particular board-like wood-base material parts, such as solid wood boards, chipboards or MDF boards (MDF=Medium Density Fiberboard), in particular for purposes of equipping these wood-base substrates with coating and printing materials varying optically and/or haptically on one or both sides, various methods are known from the prior art.

According to conventional methods, for this purpose the wood-base substrate can be provided with a high-gloss surface based on a finish in a multistage work process with complicated staining, grinding and subsequent finishing.

However, particularly in the processing of solvent-containing finishes and printing inks, emissions of volatile organic compounds are an increasing problem for the coating of wood-base materials. In addition, the finishing and printing processes used nowadays give rise to extremely high capital costs and costs for space, energy and operation and for compliance with emissions legislation which increasingly restricts production.

An alternative to the abovementioned multistage staining, grinding and finishing or printing process is the application of a sealing layer to the corresponding wood-base material surface. Thus, for example, WO 02/094457 A2 describes a process and an apparatus for the production of material parts, in particular wood-base material parts, comprising a sealing layer on the surface, this sealing layer being in the form of a water- and solvent-free, polyurethane-based reactive hotmelt layer which cures with atmospheric moisture and is subsequently smoothed with a roll. A disadvantage of this process is the only small variability of the decoration. Furthermore, the sealing layer produced in this manner does not always have the desired evenness or smoothness. Moreover, the sealing layer obtained in this manner does not always meet the desired requirements, in particular with regard to the required abrasion resistance or hardness. Finally, owing to the use of moisture-crosslinking reactive polyurethane hotmelts as coating material, the coating method described in WO 02/094457 A2 permits only low feed speeds because of the initially thermal plastic behavior of the coating material.

The prior art furthermore discloses methods in which plastic sheets or plastic films laminate to the corresponding wood-base materials. Plastic sheets or films suitable for this purpose are sold, for example, by Senoplast Klepsch & Co. GmbH, Piesendorf, Austria. A disadvantage of this method is that only very special plastic sheets or films are used, which are comparatively expensive and are available only in a limited decoration range so that arbitrary individual decorative design is not possible.

It is therefore the object of the present invention to provide a method which is suitable for laminating plastic films with wood-base substrates, in particular for the production of high-gloss surfaces on wood-base substrates, and in particular at least substantially avoids or at least reduces the above-described disadvantages of the prior art.

A further object of the present invention is the provision of a method for coating or laminating wood-base materials or wood-base substrates, in particular board-like wood-base materials, such as solid wood boards, chipboards, MDF boards and the like, with plastic films, in particular for purposes of the production of high-gloss surfaces on wood-base materials or wood-base substrates, and such a method—in comparison with the methods of the prior art—should be much more advantageous in terms of capital costs, energy costs and/or application (costs) and should be of much higher quality and/or much more efficient and flexible in use, should operate very substantially without emission and should therefore be environmentally compatible and in this way should permit novel innovative design possibilities for coatings with plastic films for the producers of articles, in particular from coated wood-base materials.

The object of the present invention is therefore firstly the avoidance or the replacement of complicated staining, grinding and finishing methods by film lamination which is relatively simple to handle and secondly the production of high-gloss surfaces on wood-base materials or wood-base substrates.

The present invention therefore relates—according to a first aspect of the present invention—to a method for laminating a plastic film with a wood-base substrate, in particular for producing a high-gloss surface on a wood-base substrate, in which a plastic film is laminated by means of a laminating agent, preferably an adhesive, with a wood-base substrate and permanently bonded to the wood-base substrate, the plastic film being formed so as to be transparent on its top.

BRIEF SUMMARY

A method for laminating a plastic film with a wood-base substrate, in particular for producing a high-gloss surface on a wood-base substrate, in which a plastic film is laminated by means of a laminating agent, preferably an adhesive, with a wood-base substrate and permanently bonded to the wood-base substrate, the plastic film being formed so as to be transparent on its top, and the products obtainable in this manner and their use, in particular in the area of the wood and furniture industry, for example for the production of pieces of furniture and fitments of all kinds.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

In general, the method according to the invention or the lamination is carried out in such a way that a high-gloss surface is produced on the wood-base substrate.

In the context of the present invention, the term "lamination" refers to the bonding of two or more layers (i.e. in the context of the present invention, specifically the bonding of the plastic films with wood-base substrates) with the aid of a suitable laminating agent, also referred to synonymously as bonding agent, suitable adhesives preferably being used as laminating agents, as will be described below. For further details of the term "lamination", reference may be made, for example, to Römpp Chemielexikon, 10th Edition, Volume 3, 1997, Georg Thieme Verlag Stuttgart/New York, page 2088, keyword: "Kaschieren" [Lamination], and page 2339, keyword: "Laminate" [Laminates], the total content of which, including the content of the literature referred to there, shall now be incorporated by reference.

As described above, the plastic film used according to the invention is formed so as to be transparent on its top. The term "top" is to be understood as meaning the side facing away from the wood-base substrate, i.e. so to speak the outside of the plastic film (whereas the inside of the plastic film—also referred to synonymously as back—is bonded or adhesively bonded to the wood-base substrate).

The term "transparency" is used herein with regard to the plastic film according to the invention in the sense in which it is usually understood and designates in particular the property of the film that it is possible to see through the film, in particular onto the surface of the underlying wood-base substrate or, in the case of printing on the back, onto this printing, i.e. the term "transparency" in the context of the present invention designates descriptively the visually perceptible clearness or light transmittance of the plastic film. In particular, according to the invention, the term "transparency" designates the quotient $\phi_{ex}/\phi_{in}$ which is defined in the related sense as transmission and the inverse value of which is referred to as opacity and is considered to be a measure of the optical density, which can be determined, for example, using densitometers. In particular, the term transparency of the film used according to the invention characterizes the measure of the light transmittance (cf. in this context also Römpp Chemielexikon, 10th Edition, Volume 6, 1999, Georg Thieme Verlag Stuttgart/New York, page 4612, keyword: "Transparenz" [Transparency]). In descriptive terms, a plastic film as such or as a whole is referred to as being transparent when it is possible virtually to see through it on visual inspection or at a glance and objects located behind (for example an inscription with letters or a colored finish) is detectable for the human eye. However, the property of transparency of the plastic film, required according to the invention, relates only to the top or outside thereof, since the back of the plastic film which is bonded to the wood-base substrate may optionally be printed on or provided with a colored finish (for example for achieving special optical effects). In embodiments in which no printing or color finish is provided on the back, a completely transparent plastic film having the abovementioned transparency properties can of course be used.

In particular, in the context of the present invention, a transparent plastic film is understood as meaning a plastic film having a transparency according to ASTM D 1003-61, Method A, of at least 70%, preferably at least 80%, particularly preferably at least 85%, very particularly preferably at least 90%. Accordingly the opacity or haze of the plastic film used according to the invention should be below 30%, preferably below 20%, particularly preferably below 15%, very particularly preferably 10%, according to ASTM D 1003-61, Method A. The abovementioned transparency or opacity values relate to the top of the plastic film used according to the invention, since the back of the plastic film bonded to the wood-base substrate may optionally be printed on or provided with a color finish (for example for achieving special optical effects). In embodiments in which no printing or color finish is provided on the back, a completely transparent plastic film which as a whole or as such fulfils the abovementioned transparency or opacity parameters can be used.

In the method according to the invention, the plastic film and/or the wood-base substrate, preferably only the plastic film, is treated with the laminating agent and then the plastic film and the wood-base substrate are united or joined, in particular in such a way that the plastic film is permanently bonded to the wood-base substrate and preferably over the whole surface, or the plastic film is laminated with the wood-base substrate, preferably over the whole surface.

The treatment of the plastic film and/or of the wood-base substrate, preferably only of the plastic film, with the laminating agent, in particular adhesive, is generally effected over the whole surface (i.e. with continuous application of a layer of the laminating agent) and/or in general homogeneously, in particular with uniform layer thickness. In this way, a secure bond between plastic film on the one hand and wood-base substrate on the other hand, in particular in combination with good optical properties, is ensured. In particular, homogeneous application of laminating agent or adhesive over the whole area ensures bonding between plastic film on the one hand and wood-base substrate on the other hand which is integral or covers the whole surface and is good and formed without bubbles over all surface regions. The application of the laminating agent or adhesive to the wood-base substrate should—like the entire laminate—be at least substantially free of air inclusions, in particular bubbles, since otherwise an optical greying effect and hence an impairment of the high-gloss surface would result.

In general, the method according to the invention is carried out in such a way that the joining of plastic film and wood-base substrate after treatment of plastic film and/or wood-base substrate, preferably only of the plastic film, with the laminating agent or adhesive is effected under pressure and/or contact pressure. This can be effected, for example by means of rollers, rolls, calenders and the like, preferably using calenders.

According to a particular embodiment of the present invention, the method according to the invention can be carried out using a laminating apparatus as described in DE 198 17 835 A1, the entire disclosure content of which in this context is hereby incorporated by reference.

Advantageously, the joining of plastic film and wood-base substrate is effected with heating, in particular above the melting or softening range of the laminating agent, in particular adhesive. According to a particularly preferred embodiment, the plastic film is first treated with a suitable laminating agent, in particular adhesive, preferably hotmelt adhesive, and then joined to the wood-base substrate to be coated. Usually, the adhesive, in particular hotmelt adhesive, can be heated above its melting or softening point before and/or during the joining of adhesive film and wood-base substrate, so that a secure adhesive bond between plastic film on the one hand and wood-base substrate on the other hand is ensured.

The treatment or coating of the wood-base substrate with the plastic film can be effected in principle on one or both sides of the wood-base substrate, treatment on only one side being preferred. In the method according to the invention, however, it is in principle possible to provide treatment or coating of the wood-base substrate with the plastic film on one or both sides. Thus, for example, both surfaces of a wood-base substrate, for example of a solid wood board, a chipboard or an MDF board, can be treated by the method according to the invention with the plastic film or only one of these two surfaces can be treated therewith, depending on the desired use.

According to a particularly preferred embodiment, the method according to the invention can be carried out continuously, in particular in an automated manner. For this purpose, the plastic film and the wood-base substrate to be treated with or bonded to the plastic film can, after application of the laminating agent, in particular adhesive, be continuously joined, usually by means of continuously moving transport apparatuses which continuously advance and continuously join and bond or laminate the plastic film on the one hand and the wood-base substrate on the other hand.

As described above, the treatment of the plastic film and/or of the wood-base substrate, preferably only the plastic film, with laminating agent, in particular with adhesive, is effected completely and/or homogeneously, in particular with uniform layer thickness. In this way, a secure adhesive bond is ensured over the entire surface. Advantageously, the laminating agent, preferably the adhesive, should be selected, in particular with regard to the amount applied and/or the processing properties, in particular the viscosity, so that on the one hand a secure bond between plastic film and wood-base substrate results and on the other hand a flat surface structure of the underlying wood-base substrate is achieved (the wood-base material surface, which by nature is relatively rough, must be so to speak smoothed or leveled with the aid of the laminating agent).

For carrying out the method according to the invention, in particular in continuous and/or automated operation, it may be advantageous if the plastic film is in the form of a web. In this way, the plastic film can be joined and bonded or laminated continuously with the wood-base substrate to be treated.

According to the invention, plastic films used may be both single-layer and multilayer plastic films. In the case of multilayer plastic films, for example, a laminate or coextrudate of at least two plastic films may be used. The plastic film laminate or coextrudate may be formed on the basis of identical or preferably different plastic films (i.e. on the basis of plastic films which are formed from identical or preferably different materials).

For example, in the case of multilayer plastic films, the original films or layers may have different hardnesses. Thus, the top or outer film can advantageously be in the form of a relatively hard, scratch-resistant film while the back or inner film may be in the form of a relatively soft, plastically deformable film for better optical smoothing of the rough wood-base material surface and for better adhesion thereon.

In the method according to the invention, it is possible in principle to use uncoated as well as coated plastic films. Plastic films coated on their top or outside, in particular provided with a high-gloss clearcoat, can be used, for example, when it is intended to achieve particular high-gloss effects which are intended to go beyond the gloss effects of the actual plastic film as such, in particular when the surface gloss is to be further increased.

In the method according to the invention, it is possible in principle to use printed as well as unprinted plastic films. Particularly for achieving special optical effects, plastic films printed on the back can be used; after the lamination process, this printing is visible as an optical decoration owing to the transparency of the top of the plastic film, provided that color printing on the back is chosen.

Thus, a multiplicity of polymer types may be chosen as plastic film materials. The subsequent performance characteristics play a substantial role: if there are high requirements with regard to thermal stability, scratch resistance and optical transparency, in particular polyester films, in particular based on polyethylene terephthalate, can be used. Corresponding plastic films having suitable layer thicknesses are obtainable both as monoextrudates and as coextrudates, for example from Mitsubishi Polyester Film GmbH, Wiesbaden, Germany (e.g. the product series "Hostaphan®" and "Diafoil®").

Regarding the material of the plastic film, it is possible in principle to use plastic films based on polyolefins, such as polyethylene and polypropylene; polyesters, in particular polyethylene terephthalates (PET); poly(meth)acrylates; polystyrenes; and/or acetates. In the case of the use of a composite or laminate or coextrudate of at least two plastic films, it is also possible to combine different materials from the abovementioned materials with one another.

According to the invention, plastic films having thicknesses in the range from 0.005 to 15 mm, in particular 0.01 to 10 mm, preferably 0.05 to 5.0 mm, particularly preferably 0.075 to 3.0 mm, are used. The abovementioned lower limits are explained on the basis of the fact that a certain mechanical stability of the plastic films used is required. The abovementioned upper limits in turn are explained firstly by a certain required flexibility and secondly by good processability and transparency.

In order to be able to withstand to a particular degree the mechanical requirements of the lamination process and of the subsequent coating, plastic films which are oriented, in particular uniaxially, preferably biaxially oriented (i.e. in the longitudinal and transverse direction), are advantageously used.

The tensile strength (ISO 527-1-2; test conditions: test speed 100%/min; 23° C.; 50% relative humidity) of the plastic films used in the longitudinal and transverse direction should be at least 100 N/mm$^2$, in particular at least 120 N/mm$^2$, preferably at least 140 N/mm$^2$. Furthermore, the tensile strength in at least one direction, preferably in the transverse direction, should be at least 180 N/mm$^2$, in particular at least 190 N/mm$^2$, preferably at least 200 N/mm$^2$. In this way, good processing properties and performance characteristics are achieved.

For further optimization of the processing properties and performance characteristics, the modulus of elasticity (ISO 527-1-2; test conditions: test speed 100%/min; 23° C.; 50% relative humidity) of the plastic films used in the longitudinal and transverse direction should be at least 3,000 N/mm$^2$, in particular at least 3,200 N/mm$^2$, preferably at least 3,500 N/mm$^2$. Furthermore, the modulus of elasticity in at least one direction, preferably in the transverse direction, should be at least 4,000 N/mm$^2$, in particular at least 4,500 N/mm$^2$, preferably at least 5,000 N/mm$^2$.

Furthermore, the elongation at break (ISO 527-1-2; test conditions: test speed 100%/min; 23° C.; 50% relative humidity) of the plastic films used in the longitudinal and transverse direction should be at least 90%, in particular at least 100%, preferably at least 110%. Furthermore, the elongation at break in at least one direction, preferably in the longitudinal direction, should be at least 180%, in particular at least 190%, preferably at least 200%.

For achieving good high-gloss properties, the plastic films used according to the invention should have, on their top or outside (i.e. more precisely on the surface of their top or outside), a gloss (DIN 67530, angle of measurement 60°) of at least 100, in particular at least 120, preferably at least 140, particularly preferably at least 150. In particular, the gloss value should be in the range from 100 to 200, preferably 120 to 180, in particular 140 to 160.

Furthermore, for achieving good optical as well as haptic properties, the roughness Ra (DIN 4762; "Cut-off": 0.25 mm) should be not more than 60 nm, in particular not more than 50 nm, preferably not more than 45 nm, and in particular should be in the range from 10 to 60 nm, preferably 25 to 50 nm.

Regarding the wood-base substrates used according to the invention, it is possible in principle to use any desired wood-base materials. Preferably, however, board-like and/or sheet-like wood-base substrates, such as solid wood boards, chipboards, MDF boards or the like, are used. Also suitable are veneers and so-called lightweight building boards or honeycomb boards. In principle, however, it is also possible to use non-sheet-like or three-dimensionally shaped wood-base substrates. For example, wood profiles, as can be obtained, for example, starting from MDF boards or chipboards, can also be used.

The wood-base substrates are in principle not limited from the point of view of their dimensioning. However, wood-base substrates in particular having thicknesses of 0.1 to 150 mm, preferably 0.3 to 120 mm, are advantageously used.

Wood-base substrates which may be used are therefore virtually any desired, in particular sheet-like wood-base materials, in particular a multiplicity of technically relevant materials, such as, for example, the abovementioned boards comprising solid wood, chipboards and MDF boards or veneers and lightweight building boards or honeycomb boards. These boards themselves can optionally also be coated or uncoated, it being possible for these coatings to be, for example, veneers, decorative papers or melamine resin laminates. So-called CPL-coated or HPL-coated boards can also be used as wood-base substrates (CPL=Continuous Pressure Laminate and HPL=High Pressure Laminate). As described above, the thickness of the sheet-like wood-base materials may vary within a wide range. Thus, thin veneers having a thickness of about 0.1 mm up to, for example, kitchen worktops having a thickness of about 150 mm can be provided with a high-gloss surface in a continuous method according to the invention. As described above, however, it is also possible to use wood profiles.

Regarding the laminating agent used according to the invention, in particular the adhesive, said laminating agent or adhesive is used or applied in general in an amount of 0.1 to 200 g/m$^2$, preferably 0.5 to 100 g/m$^2$, preferably 1 to 50 g/m$^2$, for ensuring a secure bond between plastic film on the one hand and wood-base substrate on the other hand in combination with good processing properties and good optical properties, etc. For this purpose, layer thicknesses of the laminating agent or adhesive of 1 to 1,000 μm, preferably 1 to 500 μm, particularly preferably 5 to 250 μm, particularly preferably 25 to 150 μm, are usually applied, depending on laminating agent or adhesive.

As described above, the application of the laminating agent, in particular of the adhesive, is usually effected with heating, in general with melting of the laminating agent, preferably at temperatures in the range from 80 to 200° C., in particular 90 to 170° C.

The application of the adhesive can be effected in any desired manner, for example by means of nozzles, spray apparatuses, doctor blades, rolls and the like. The application of adhesive is preferably effected by means of nozzle application, for example through slot dies. It is possible to use either contact methods in which the die lip is in contact with the material to be treated with adhesive or so-called noncontact methods in which the die lip is a distance away from the material to be treated with adhesive (e.g. in general about 1 to 5 mm). If the adhesive coating is effected by noncontact application (e.g. according to the technology of DE 198 17 835 A1), an extrudable and/or film-forming hotmelt adhesive should be used. As described above, the adhesive application can alternatively preferably be effected via a slot die by the contact method. Technologically possible, but less preferred owing to the greater risk of introducing impurities, on the other hand, is the use of a roll-coating method.

A solvent-free adhesive, in particular a hotmelt adhesive, is usually used as the laminating agent. These are in particular water- and solvent-free adhesives which are solid at room temperature and which are applied from the melt to the materials to be adhesively bonded and, after joining, physically and/or chemically set on cooling with solidification. For further details regarding the term "hotmelt adhesive", reference may be made, for example, to Römpp Chemielexikon, 10th Edition, Volume 5, 1998, Georg Thieme Verlag Stuttgart/New York, page 3975, keyword: "Schmelzklebstoffe" [Hotmelt adhesives], the entire disclosure content, including the literature referred to there, hereby being incorporated by reference.

Adhesives suitable as laminating agents according to the invention, in particular hotmelt adhesives, should advantageously be formed so as to be transparent or colorless (regarding the term transparency, cf. above statements). In this way, the optical effects achieved by the plastic film lamination are not impaired. Furthermore, the adhesive used, in particular hotmelt adhesive, should be formed so as to be stable to oxidation or colorfast, in particular UV-stabilized and/or resistant to yellowing, so that no optically undesired long-term effects occur.

In particular, hotmelt adhesives of thermoplastic and/or reactive quality may be used as hotmelt adhesives suitable according to the invention, depending on requirements.

The adhesives used, in particular hotmelt adhesives, are chosen in particular depending on the materials to be adhesively bonded and the requirements in this context, for example the required thermal or heat stability of the adhesive bond, etc.

Thermoplastic hotmelt adhesives used may be in particular those based on ethylene/vinyl acetates (EVA), polyolefins (e.g. amorphous poly-α-olefins or polyolefins prepared by metallocene catalysis), polyacrylates, copolyamides, copolyesters and/or thermoplastic polyurethanes or corresponding co- and/or terpolymers.

Hotmelt adhesives used may be, for example, reactive hotmelt adhesives, in particular moisture-crosslinking and/or radiation-crosslinking, in particular UV-crosslinking, hotmelt adhesives. Examples of reactive hotmelt adhesives suitable according to the invention are hotmelt adhesives based on isocyanate-terminated polyurethanes and based on silane-grafted amorphous poly-α-olefins, particularly preferably hotmelt adhesives based on isocyanate-terminated polyurethanes.

Alternatively, reactive hotmelt adhesives based on radiation-crosslinking reactive hotmelt adhesives, in particular hotmelt adhesives crosslinking on exposure to UV radiation, may be used as hotmelt adhesives.

According to the invention, reactive hotmelt adhesives, for example moisture-crosslinking ones, which may be used are furthermore in particular those based on silane-grafted amorphous poly-α-olefins, silane-grafted polyolefins prepared by metallocene catalyst (e.g. EP 1 508 579 A1) or isocyanate-terminated polyurethanes. In the case of the reactive hotmelt adhesives, the subsequent crosslinking, for example with moisture, leads to thermally stable or heat-stable adhesive bonds. Reactive hotmelt adhesives thus combine the advantages of rapid initial strength due to the physical setting process of cooling with a chemical crosslinking taking place subsequently. In the processing of moisture-reactive hotmelt adhesives, the melt should be protected from moisture before its application.

For example, hotmelt adhesives based on isocyanate-terminated polyurethanes can be used, for example, for the lamination of chipboards or MDF boards with polyester films, either unprinted or in a form printed on the back, in combination with high thermal stability of the laminate.

Polymers for reactive moisture-crosslinking hotmelt adhesives equally suitable in the context of the present invention are, for example, the silane-modified poly-α-olefins obtainable commercially under the product name "Vestoplast® 206" from Degussa AG, Marl, Germany. Particularly preferred according to the invention are silane-modified poly-α-olefins having number average molecular weights $M_n$ of 5,000 to 25,000 g/mol, preferably 10,000 to 20,000 g/mol.

Further reactive hotmelt adhesives suitable according to the invention comprise—as described above—for example radiation-crosslinking reactive hotmelt adhesives (e.g. reactive hotmelt adhesives which crosslink on exposure to UV radiation). Suitable radiation-crosslinking hotmelt adhesives are, for example, UV-crosslinkable hotmelt adhesives, in particular based on (meth)acrylate polymers and copolymers or acrylated polyesters and/or polyurethanes, preferably UV-crosslinkable hotmelt adhesives based on acrylate copolymers, as sold, for example, by BASF AG, Ludwigshafen, Germany, under the name "acResin®", e.g. "acResin® A 203 UV". In the case of UV-crosslinking hotmelt adhesives, in general a photoinitiator is added to the adhesive mixture used; this can be added to the adhesive mixture either as a separate photoinitiator or may itself be a component of the UV-crosslinkable hotmelt adhesive, in particular may be present (for example in the form of chemically incorporated photoreactive groups which are bonded to the UV-reactive polymer, as is the case, for example, in the abovementioned product "acResin® A 203 UV" of BASF AG, Ludwigshafen, Germany) in the UV-reactive polymer (e.g. UV-reactive acrylate copolymer having photoreactive groups). The properties of the adhesive bond can be controlled in a targeted manner (e.g. shear strengths, etc.) by the irradiation or crosslinking durations, intensities, energies, wavelengths, etc. As described in detail below, additives based on unreactive polymers, resins and/or waxes, for example optionally hydrogenated rosin esters and aliphatic hydrocarbon resins, may be added for controlling the open time and/or the adhesion properties of the radiation-crosslinking, in particular UV-crosslinking reactive hotmelt adhesives. An example formulation particularly suitable according to the invention for a UV-crosslinking reactive hotmelt adhesive system comprises, for example, 90% by weight of UV-reactive acrylic ester copolymer (e.g. acResin® A 203 UV of BASF AG) and 10% by weight of aliphatic hydrocarbon resins (e.g. Escorez® 1310, Exxon Mobil).

The application of the adhesive to the plastic film and/or the wood-base substrate, preferably exclusively to the plastic film, can be effected in wide temperature ranges. As described above, in general the processing temperatures in the range from 80° C. to 200° C., preferably 90° C. to 170° C., are chosen.

In order to achieve good applicability of the hotmelt adhesive, those hotmelt adhesives which have Brookfield viscosities in the range of in general 50 to 1,000,000 mPa·s at the processing temperatures, in general 80° C. to 200° C., are usually used.

For example, reactive hotmelt adhesives based on silane-grafted polyolefins, in particular silane-grafted poly-α-olefins, which have Brookfield viscosities in the range from 50 to 50,000 mPa·s, in particular 1,000 to 10,000 mPa·s, preferably 5,000 to 8,000 mPa·s, particularly preferably 5,500 to 7,500 mPa·s, at 180° C. can be used in a manner preferred according to the invention.

For controlling the reactivity and the crosslinking behavior, the catalysts customary per se for these purposes, e.g. dibutyltin dilaurate (DBTL), can usually be added to the reactive hotmelt adhesives, in the amounts customary per se for these purposes. Examples of catalysts suitable according to the invention are the catalysts which are known and customary in adhesive chemistry, such as, for example, organic tin compounds, such as the abovementioned dibutyltin dilaurate (DBTL) or alkyl mercaptide compounds of dibutyltin, or organic iron, lead, cobalt, bismuth, antimony and zinc compounds and mixtures of the abovementioned compounds or amine-based catalysts, such as tertiary amines, 1,4-diazabicyclo[2.2.2]octane and dimorpholinodiethyl ether and mixtures thereof. Particularly preferred according to the invention is dibutyltin dilaurate (DBTL), in particular in combination with adhesives based on the abovementioned reactive, preferably silane-modified poly-α-olefins.

The amounts of catalyst(s) used may vary within wide ranges; in particular, the amount of catalyst used is 0.01 to 5% by weight, based on the adhesive.

For controlling the performance characteristics of the adhesives, further additives, for example, plasticizers, high-boiling organic oils or esters or other plastifying additives, stabilizers, in particular UV stabilizers, antioxidants, acid scavengers, fillers (in particular optically or visually imperceptible fillers having particle sizes in the nanometer range), antiageing agents and the like, may also be added to said adhesives.

For controlling the open time and/or the adhesion properties of the abovementioned adhesives, in particular with regard to improved handling properties, further additives based on unreactive polymers, resins and/or waxes may also be added to the abovementioned hotmelt adhesives. In this way, the adhesive properties can be adjusted in relation to the application and so to speak tailor-made. The amount of unreactive polymers, resins and/or waxes may vary within wide ranges. In general, it is in the range from 1% by weight to 70% by weight, in particular 5% by weight to 65% by weight, preferably 10% by weight to 60% by weight, based on the adhesive. Nevertheless, it may be necessary in relation to the application or depending on the specific case to deviate from the abovementioned amounts.

Regarding the unreactive polymers, these may be selected, for example, from the group consisting of (i) ethylene/vinyl acetate copolymers or terpolymers, in particular those having vinyl acetate contents between 12 and 40% by weight, in particular 18 to 28% by weight, and/or having melt flow indices (MFIs, DIN 53735) of 8 to 800, in particular 150 to 500; (ii) polyolefins, such as unmodified amorphous poly-α-olefins, in particular having number average molecular weights $M_n$ of 5,000 to 25,000 g/mol, preferably 10,000 to 20,000 g/mol, and/or having ring and ball softening ranges between 80 and 170° C., preferably between 80 and 130° C., or unmodified polyolefins prepared by metallocene catalyst (cf. DE 103 23 617 A1), and (iii) (meth)acrylates, such as styrene (meth)acrylates and mixtures of these compounds.

Regarding the unreactive resins, these may be chosen in particular from the group consisting of hydrocarbon resins, in particular aliphatic, cyclic or cycloaliphatic hydrocarbon resins, optionally modified rosins (e.g. rosin esters), terpene/phenol resins, coumarone/indene resins, α-methylstyrene resins, polymerized tall resin esters and/or ketone/aldehyde resins.

Regarding the unreactive waxes, for example, polyolefin waxes, such as polyethylene and polypropylene waxes, or waxes modified on this basis may be used.

In order further to improve or to increase the adhesion of the plastic film on the wood-base substrate, the back of the plastic film which is to be laminated with the wood-base substrate can optionally be subjected to a pre-treatment, in particular by means of corona or plasma treatment, before application of the adhesive. Equally—for improving or increasing the adhesive bond between plastic film and wood-base substrate—it is optionally possible to form or to treat the back of the plastic film to be laminated with the wood-base substrate so that said back is adhesion-promoting. The latter may in particular be advantageous if the plastic film used is a multilayer film laminate or coextrudate. In this case, for example, the inner film can be treated or formed so as to be adhesion-promoting while the outer film can be formed as a transparent, hard and scratch-resistant high-gloss film.

As explained above, the method according to the invention is suitable in particular for laminating plastic films with wood-base substrates by means of a hotmelt adhesive as a laminating agent.

According to a particular embodiment of the method according to the invention, it is possible additionally to arrange or provide a decorative layer between the plastic film and the wood-base substrate. In this embodiment, the plastic film is first laminated with the decorative layer, which in turn is laminated with the material substrate. In this way, the method according to the invention permits a further increased variability in the surface design of the wood-base material surface by the additional decorative layer. The additional decorative intermediate layer may be, for example, a paper or board layer (for example having a thickness which corresponds approximately to the thickness of the film, i.e. is in general in the range from 0.005 to 15 mm, in particular 0.01 to 10 mm, preferably 0.05 to 5.0 mm, particularly preferably 0.075 to 3.0 mm). However, instead of board or paper, the optionally provided, additional decorative layer can in principle also comprise other materials, for example plastic, textiles, leather, metal and the like.

The lamination of the plastic film with the wood-base substrate, if appropriate with the optional decorative intermediate layer, may be followed by finishing, in particular in the form of fabrication. Such finishing, in particular fabrication, may comprise in particular a size change or dimensioning, preferably cutting to size or the like, of the laminated materials produced in this manner and/or a heat treatment of the laminated materials produced in this manner and/or coating of the top or outside of the laminated plastic film (in particular with a high-gloss clearcoat).

In particular, it has proved advantageous if the laminated materials produced as described above are subjected to a heat treatment as part of the finishing, in particular immediately after their production. The laminated materials produced according to the invention are subjected, in particular on their surface laminated with the plastic film, to a temperature in the range from 50 to 125° C., in particular 50 to 100° C., preferably 60 to 80° C. This is because the applicant has surprisingly found that the gloss of the surface produced can be even further increased (for example by at least 5% (relative), based on the absolute gloss value according to DIN 67530, in particular by at least 10%) in a completely unexpected manner by such a heat treatment. The heat treatment, which can be carried out, for example, by suitable heat input by radiation, for example in a heat tunnel, a heat chamber, a heat stand, etc., is particularly efficient if it is carried out immediately after the lamination process, in particular within 30 minutes after the lamination process, preferably within 15 minutes after the lamination process, particularly preferably within 10 minutes after the lamination process. Without wishing to be tied to a certain theory, the increase in gloss by the subsequent heat treatment is possibly explained by the fact that the heat treatment results in substantial plastification of the plastic film and of the underlying adhesive and/or further smoothing of the surface structure, coupled with a reduction in respect to the stress of the laminated plastic film.

The method according to the invention is associated with a multiplicity of advantages, some—but by no means all—of which are listed below:

The method according to the invention can be carried out in a highly advantageous manner with regard to capital costs, energy costs and application costs, in a highly space-saving manner and is of high quality and efficiency and also flexible in application.

Owing to the absence of the requirement for coatings and the like, in particular because of the avoidance of expensive processes for coating sheet-like wood-base material surfaces, which are also ecologically unacceptable when solvent-based finishes are used, the method according to the invention operates very substantially without emissions and hence in an environmentally compatible and more economical manner. It therefore permits novel innovative design possibilities for coatings and decorations thereof for producers of articles from coated wood-base substrates or wood-base substrates laminated with plastic films.

In comparison with complicated coating methods or other lamination methods of the prior art, the method according to the invention makes it possible to realize production with a single working step instead of a plurality of separate operations.

With the method according to the invention, it is also possible, for example, to produce wood or furniture fronts (for example for kitchen fronts) suitable for the wood or furniture industry and provided with a high-gloss coating and optionally an additional decoration, by means of corresponding adhesive and film application.

According to typical developments, the method according to the invention can—purely by way of illustration and not limiting—be carried out as follows.

With the method according to the invention, it is possible to achieve flat or smooth, high-gloss surfaces on wood-base material boards with thin transparent films by using, for example according to embodiment (A), for example about 40 to 150 μm transparent hotmelt adhesive for contour-true coverage of the wood-base material surface; alternatively, according to embodiment (B), a thin transparent film can be laminated by means of transparent hotmelt adhesive with an arbitrarily printed paper web ("decorative intermediate layer") and this laminate can then be laminated with the wood-base material surface, the lamination pressure also resulting in smoothing of the naturally relatively rough wood-base material surface, in the case of embodiment (B) by the deformable paper web. According to another alternative embodiment (C), a transparent, multilayer coextrudate film can be used; in this case, the subsequent outer film should be chosen as a highly transparent, scratch-resistant upper film and the coextruded subsequent inner film should be chosen as a highly transparent, plastically deformable lower film, here too optical smoothing of the rough wood-base material surface likewise resulting in association with the then smaller transparent hotmelt adhesive coat of, for example, only about 15 to 75 μm. Common to all three embodiments (A) to (C) mentioned is that no microscopic air inclusions at all occur during the lamination process, since otherwise the result would be optical greying and hence no high-gloss surface.

As described above, in principle both thermal and reactive systems can be used as hotmelt adhesives for the method according to the invention. In principle, the adhesives should be transparent and stabilized to yellowing by UV light. The choice of adhesive can then be made depending on the adhesive application technique and the subsequent requirements which the bond strength of the adhesive bond has to meet: if, for example, coating of the back of the film with hotmelt adhesive is preferably effected by noncontact application, as described, for example, in DE 198 17 835 A1, an extrudable and film-forming hotmelt adhesive should be used. Exemplary adhesives for this embodiment are the thermoplastic hotmelt adhesive Jowatherm® 274.00, the UV-crosslinking hotmelt adhesive Jowatherm® UV 244.90, the moisture-crosslinking and silane-terminated hotmelt adhesive Jowatherm-Reaktant® 628.90 and the moisture-crosslinking and isocyanate-terminated hotmelt adhesive Jowatherm-Reaktant® EP 13602.70, all sold by Jowat AG, Detmold, Germany. The adhesive coat can alternatively and preferably be applied via a slot die by the contact method. Technologically possible, but less preferred owing to the greater risk of introducing impurities, is the use of a roll-coating method.

Owing to the simple use of multiple coating materials, the method according to the invention permits a multiplicity of potential uses, applications and innovations for the relevant products.

In addition, the costs for the production of the film-coated wood-base substrates can be considerably reduced by the method according to the invention.

In contrast to straightforward coating methods (cf. WO 02/094457 A2, which alternatively provides only coating with a reactive, transparent polyurethane hotmelt adhesive, optionally with a release agent applied thereon), the method according to the invention proposes the use of suitable plastic films which are laminated by means of hotmelt adhesives. The method according to the invention is economical because only a single conversion step has to be carried out, and—in comparison with the proposed method of WO 02/094457 A2—it is substantially more flexible and productive. The method according to the invention is more flexible compared with WO 02/094457 A2 because through the choice of the film, for example, high-gloss, very exciting impressions can be achieved but also dull, whitewashed appearances may result; if desired, completely transparent films to films printed on the back or colored throughout can be used. The method according to the invention is more productive compared with WO 02/094457 A2 because the sheet-like wood-base materials can be further processed immediately after film lamination is complete, whereas the coating proposed according to WO 02/094457 A2, with moisture-cross-linking PU hotmelt adhesive permits only low feed speeds owing to the initially thermoplastic behavior of the coating material.

The present invention furthermore relates—according to a second aspect of the present invention—to the products obtainable by the method according to the invention, i.e. laminated materials which have an at least substantially sheet-like substrate material in the form of a plastic film which is formed so as to be transparent on its top, the plastic film being laminated by means of a suitable bonding or laminating agent, in particular an adhesive, with a wood-base substrate in such a way that the plastic film is bonded permanently and preferably over the whole area to the substrate, in particular the plastic film is laminated with the wood-base substrate.

In other words, the present invention relates, according to this second aspect, to a laminated material, in particular a wood-base substrate having a high-gloss surface, which has a plastic film which is formed so as to be transparent on its top and the bottom or back of which is laminated by means of a laminating agent, preferably an adhesive, with the wood-base substrate, in particular in such a way that the plastic film is bonded permanently and preferably over the whole area to the wood-base substrate so that a wood-base substrate having a high-gloss surface results.

For further details with regard to the products or laminated materials according to the invention, reference may be made to the above statements about the method according to the invention, which apply in a corresponding manner with regard to the products or laminated materials according to the invention.

The present invention furthermore relates—according to a third aspect of the present invention—to the use of the products and laminated materials according to the invention in the wood and furniture industry, in particular for the production of pieces of furniture and fitments.

Finally—according to a further aspect of the present invention—a further subject comprises the products as such which are produced using the products according to the invention, i.e. the furniture and fitments of any kind which are obtainable starting from the products or laminated materials according to the invention.

Further developments, modifications, variations and advantages of the present invention are directly evident and realizable for the person skilled in the art on reading the description, without departing from the scope of the present invention.

The present invention is illustrated with reference to the following examples, which, however, in no way limit the present invention.

EXAMPLES

Examples 1A to 1D

A web-like decorative plastic film printed in color on one side and based on an oriented polyester film ("high-gloss film") is treated on its side provided with the printing, by means of a slot die or laminating roll, with a hotmelt adhesive over the whole area and with uniform layer thickness in an amount of about 50 g/m².

Four different adhesives sold in each case by Jowat AG, Detmold, Germany, are used alternatively as hotmelt adhesives in the four experiments, namely:
(A) a polyolefin film-laminating hotmelt adhesive of the type Jowatherm® 274.00 (processing temperature/die: about 125° C.) (Example 1A),
(B) a UV hotmelt adhesive of the type Jowatherm® UV 244.90 (processing temperature: 120 to 140° C.) (Example 1B),
(C) a reactive, isocyanate-free moisture-crosslinking polyolefin hotmelt adhesive of the type Jowatherm® 628.90/91 (processing temperature: 160 to 190° C.) (Example 1C) and
(D) a reactive moisture-crosslinking polyurethane hotmelt adhesive of the type Jowatherm-Reaktant® EP 13602.70 (processing or reactivation temperature/laminating roll: about 130° C.) (Example 1D).

The web-like plastic film created in this manner with adhesive is then joined with a board-like wood-base substrate in the form of an MDF board. The joining is effected under pressure or contact pressure by means of a heatable calender so that the plastic film is laminated by means of the hotmelt adhesive with the MDF board and an intimate bond between plastic film on the one hand and MDF board on the other hand is produced.

The wood-base substrate laminated with the plastic film is subsequently cooled and can subsequently optionally be cut to size or dimensioned for the relevant application. An MDF board which has a high-gloss coating and can be used in particular in the wood or furniture industry (e.g. for kitchen fronts) results.

The method according to the invention is substantially simplified compared with conventional coating methods. Moreover, solvent emissions are avoided. In addition, printing on the film is protected in an efficient manner by the arrangement on the inside.

Example 2

Primed or unprimed PET high-gloss films modified in color and obtained from Mitsubishi Polyester Film GmbH, Wiesbaden, Germany, are laminated in variable thicknesses from 25 to 300 μm with an MDF board by means of the adhesive Jowatherm-Reaktant® EP 13602.70. By means of a slot die, a uniform, stripe-free adhesive coat without air inclusions and small bubbles is achieved on the films, which are then laminated in a conventional manner with the wood-base substrate.

In a further experiment, an unimpregnated 60 g/m² decorative paper is laminated with a PET high-gloss film in thicknesses from 25 to 125 μm. Here, the adhesive coat is constant in each case at 15 g/m². A defect-free, reflective, high-gloss film surface is the result. These doubled PET films are then laminated with melamine resin-coated MDF chipboards. Here too, a smooth, defect-free high-gloss surface is achieved.

PET high-gloss films used are highly transparent, biaxially oriented polyethylene terephthalate films (PET films) of the type "Hostaphan®" from Mitsubishi Polyester Film GmbH, Wiesbaden, Germany.

While the preferred embodiment of the invention has been illustrated and described in the foregoing description, the same is to be considered as illustrative and not restrictive in character, it being understood that all changes and modifications that come within the spirit of the invention are desired to be protected.

The invention claimed is:

1. A method for producing a wood-base substrate provided with a high-gloss surface by laminating a plastic film with a wood-base substrate, the method comprising laminating a plastic film with a wood-base substrate by applying a laminating agent there between and applying pressure and heat, thereby permanently bonding the plastic film to the wood-base substrate, the treatment of the plastic film with the laminating agent being effected over the whole area of the plastic film and homogeneously with uniform layer thickness in the range of from 1 to 1,000 μm, wherein the plastic film is formed so as to be transparent on its top, has a thickness of 0.005 to 15 mm and has, on its top, a gloss value, as determined according to DIN 67530 at an angle of measurement of 60°, in the range of from 100 to 200, and wherein the plastic film is an oriented plastic film and wherein the tensile strength of the plastic film in the longitudinal and transverse direction is at least 100 N/mm² and wherein the modulus of elasticity of the plastic film in the longitudinal and transverse direction is at least 3,000 N/mm² and wherein the elongation at break of the plastic film in the longitudinal and transverse direction is at least 90% and wherein the laminating agent is a transparent or colorless, extrudable or film-forming, solvent-free hotmelt adhesive, such that a wood-base substrate provided with a high-gloss surface is obtained, wherein a decorative layer is additionally arranged between the plastic film and the wood-base substrate, and wherein the lamination of the plastic film with the wood-base substrate is followed by a heat treatment subjecting the laminated material on its surface laminated with the plastic film to a temperature in the range of 50-100 degrees C. within 15 minutes after the lamination process.

2. The method according to claim 1, wherein the plastic film is first treated with the laminating agent and then the plastic film and the wood-base substrate are united in such a way that the plastic film is permanently bonded to the wood-base substrate and that the plastic film is laminated with the wood-base substrate.

3. The method according to claim 1, wherein the joining of plastic film and wood-base substrate is effected with heating above the melting or softening range of the laminating agent.

4. The method according to claim 1, wherein the plastic film used is a single-layer or multilayer plastic film.

5. The method according to claim 1, wherein the plastic film used is a plastic film based on polyolefins, polyesters, poly(meth)acrylates, polystyrenes or acetates.

6. The method according to claim 1, wherein the laminating agent is applied in an amount of from 0.1 to 200 g/m² and wherein the laminating agent is applied with heating at temperatures in the range of from 80 to 200° C.

7. The method according to claim 1, wherein the laminating agent used is a hotmelt adhesive selected from the group consisting of thermoplastic and reactive hotmelt adhesives.

8. The method according to claim 1, wherein the laminating agent used is a thermoplastic hotmelt adhesive based on ethylene/vinyl acetates, polyolefins, polyacrylates, copolyamides, copolyesters or polyurethanes.

9. The method according to claim 1, wherein the laminating agent used is a moisture-crosslinking or radiation-crosslinking hotmelt adhesive.

10. The method according to claim 1, wherein the lamination of the plastic film with the wood-base substrate is followed by finishing, the finishing comprising fabrication and size change.

11. Laminated material having a plastic film laminated with a wood-base substrate as obtained by the method of claim 1.

12. Furniture comprising a laminated material as obtained by the method of claim 1.

* * * * *